(12) United States Patent
Kershaw

(10) Patent No.: US 6,684,302 B2
(45) Date of Patent: Jan. 27, 2004

(54) BUS ARBITRATION CIRCUIT RESPONSIVE TO LATENCY OF ACCESS REQUESTS AND THE STATE OF THE MEMORY CIRCUIT

(75) Inventor: Daniel Kershaw, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 10/202,030

(22) Filed: Jul. 25, 2002

(65) Prior Publication Data
US 2002/0188809 A1 Dec. 12, 2002

(30) Foreign Application Priority Data
Jan. 19, 1999 (GB) .............................. 9901140

(51) Int. Cl.⁷ .......................... G06F 12/00; G06F 13/28
(52) U.S. Cl. ....................................................... 711/151
(58) Field of Search ............................... 711/133, 151; 710/112, 116, 39, 41

(56) References Cited

U.S. PATENT DOCUMENTS

| | | | |
|---|---|---|---|
| 4,257,095 A | 3/1981 | Nadir | |
| 4,513,367 A | 4/1985 | Chan et al. | |
| 4,669,079 A | 5/1987 | Blum | |
| 5,313,587 A | 5/1994 | Patel et al. | |
| 5,345,577 A | 9/1994 | Chan et al. | |
| 5,463,739 A | 10/1995 | Albaugh et al. | |
| 5,524,235 A | 6/1996 | Larson et al. | |
| 5,542,066 A | 7/1996 | Mattson et al. | |
| 5,636,355 A | 6/1997 | Ramakrishnan et al. | |
| 5,638,534 A | 6/1997 | Mote, Jr. | |
| 5,664,154 A | 9/1997 | Purcell et al. | |
| 5,666,494 A | 9/1997 | Mote, Jr. | |
| 5,765,199 A | 6/1998 | Chang et al. | |
| 6,006,303 A | * 12/1999 | Barnaby et al. | 711/151 |
| 6,032,232 A | * 2/2000 | Lindeborg et al. | 711/149 |
| 6,065,102 A | * 5/2000 | Peters et al. | 711/151 |
| 6,304,923 B1 | * 10/2001 | Klein | 710/41 |
| 6,415,367 B1 | * 7/2002 | Baxter et al. | 711/158 |

FOREIGN PATENT DOCUMENTS

| | | |
|---|---|---|
| EP | 0 310 446 | 4/1989 |
| EP | 0 391 517 | 10/1990 |
| EP | 0 432 978 | 6/1991 |
| EP | 0 468 831 | 1/1992 |
| GB | 1193719 | 6/1970 |
| GB | 2 284 911 | 6/1995 |
| JP | 10-254775 | 9/1998 |
| WO | WO 97/36243 | 10/1997 |

* cited by examiner

Primary Examiner—Jack A. Lane
(74) Attorney, Agent, or Firm—Nixon & Vanderhye P.C.

(57) ABSTRACT

A data processing system 2 is described including a cache memory 8 and a plurality of DRAM banks 16, 18, 20, 22. A victim select circuit 32 within a cache controller 10 selects victim cache storage lines 28 upon a cache miss such that unlocked cache storage lines are selected in preference to locked cache storage lines, non-dirty cache storage lines are selected in preference to dirty cache storage lines, and cache storage lines requiring a write back to a non-busy DRAM bank are selected in preference to cached storage lines requiring a write back to a busy DRAM storage bank. A DRAM controller 24 is provided that continuously performs a background processing operation whereby dirty cache storage lines 28 within a cache memory 8 are written back to their respective DRAM banks 16, 18, 20, 22 when these are not busy performing other operations and when the cache storage line has a least recently used value below a certain threshold. A bus arbitration circuit 12 is provided that re-arbitrates bus master priorities in dependence upon determined latencies for respective memory access requests. As an example, if a high priority memory access request results a cache miss, with a lower priority memory access request resulting in a cache hit, then the lower priority memory access request will be re-arbitrated to be performed ahead of the normally higher priority memory access request and may be finished before that higher priority memory access request starts to return data words to a data bus 14.

13 Claims, 4 Drawing Sheets

Victim Select

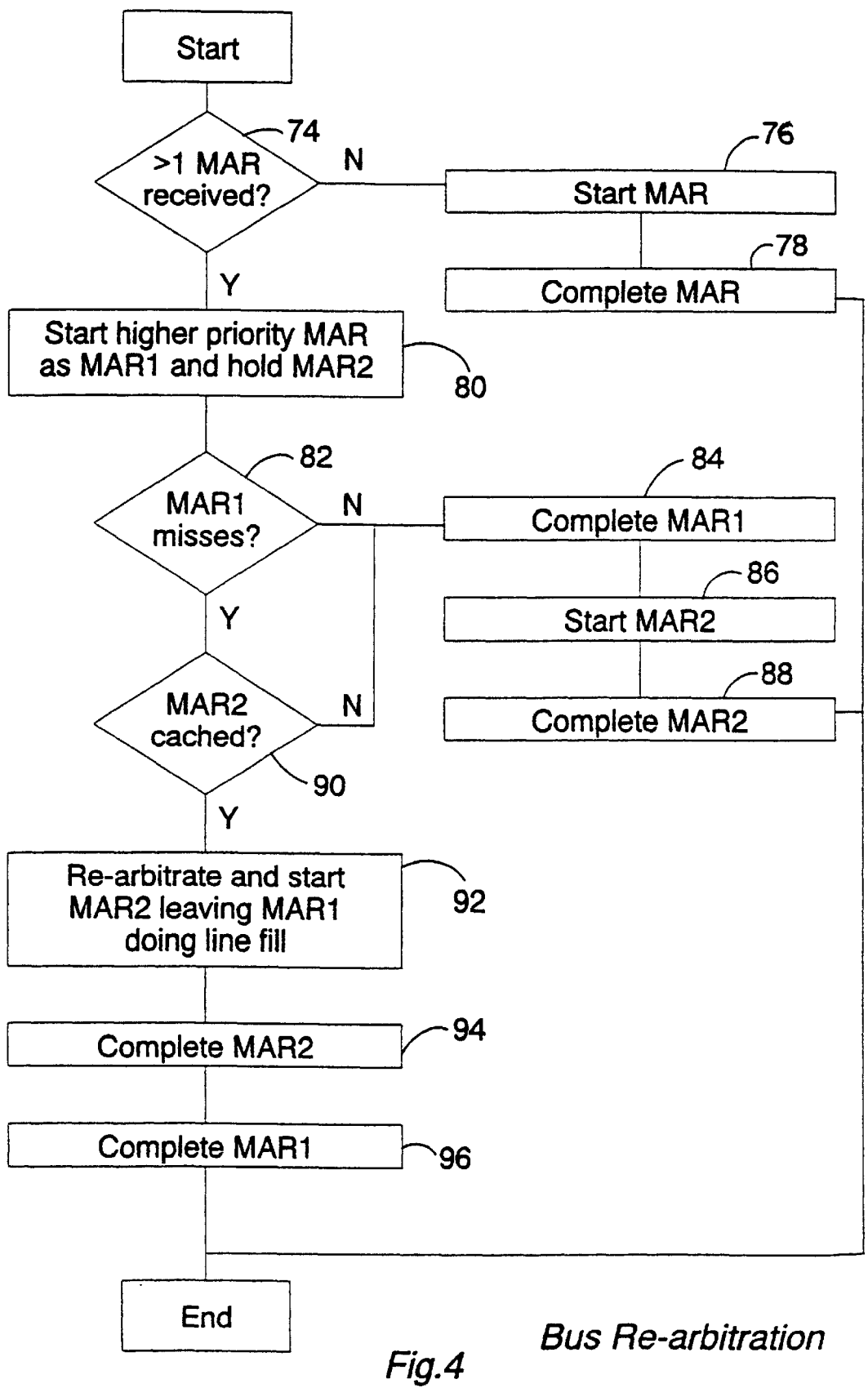
Fig.4     Bus Re-arbitration

BUS ARBITRATION CIRCUIT RESPONSIVE TO LATENCY OF ACCESS REQUESTS AND THE STATE OF THE MEMORY CIRCUIT

BACKGROUND OF THE INVENTION

1. Field of the Invention

The present invention relates to data processing systems. More particularly, the present invention relates to the management and control of the memory system within a data processing system.

2. Description of the Prior Art

It is desirable that data processing systems should operate as quickly as possible to meet the increasing demands for processing capability placed upon them. In this regard, there is continual progress in producing processing systems that operate at higher speeds and so are able to execute more instructions per second. As the processors increase in speed, it is important that other systems of the data processing system should also increase in speed if they are not to become a processing bottleneck holding back the overall performance of the system. An example of such an other system is the memory system associated with a data processing system.

A memory system of a high performance data processing system may comprise a hierarchy of levels of data storage, e.g. an internal on-chip cache, an external off-chip cache, a random access memory and a non-volatile memory, such as a hard drive or flash ROM. Schemes which can increase the overall performance of the memory system of a data processing system are highly advantageous.

SUMMARY OF THE INVENTION

Viewed from one aspect the present invention provides data processing apparatus comprising:

(i) a cache memory having a plurality of cache storage lines;

(ii) a plurality of main memory units operable to store data words to be cached within said cache memory; and (iii) a cache victim select circuit for selecting a victim cache storage line into which one or more data words are to be transferred from one of said main memory units following a cache miss; wherein (iv) said cache victim select circuit is responsive to an operational state of at least one of said main memory units when selecting said victim cache storage line.

A cache memory does not typically have enough storage capacity to store all of the data that may be required by the system. Accordingly, the cache memory stores a subset of the total data and when a memory access request is made to an item of data not stored within the cache, then that item of data must be fetched to the cache. In order to make room for the new item of data within the cache, an existing item of data has to be removed from the cache. The selection of which cache storage line (set of data items) should be replaced is performed by a cache victim select circuit. When there are a plurality of main memory units holding the data that is to be cached within the cache memory, then different victim selections will require accesses to be made to different ones of this main memory unit. In this circumstance, it is strongly desirable that the cache victim select circuit should be responsive to the operational state of at least one of the main memory units. Arranging the cache victim select circuit to be responsive to an operation state of at least one of the main memory units allows the victim selection to be adjusted depending upon the detected operational state and accordingly higher performance to be achieved through the selection of a cache victim that will cause the least delay.

The present invention is particularly useful when the cache memory is configured as a write back cache memory. In such embodiments data words from the victim cache line have to be written back to the main memory from where they originally came and so the operational status of that main memory may be critical in determining the degree of delay that would be associated with selection of that particular cache line as the victim cache line.

One highly useful operational parameter to sense regarding a main memory unit is whether or not that main memory unit is already busy exchanging one or more data words with the cache memory. If the main memory unit is already busy, then its current operation will have to complete before it is able to service any requirements stemming from the selection of a victim cache storage line that requires that busy main memory unit to be accessed.

The advantages of the invention are particularly evident when there are many memory masters simultaneously requesting access and a plurality of main memory units that are able to operate independently and concurrently transfer data words to the cache memory. In such embodiments it is highly desirable to select as a cache victim a cache storage line that is not already busy performing a data exchange with the cache memory. The ability of parallel data exchanges with the cache memory to occur increases system performance and accordingly it is desirable that the memory access workload be split evenly between the main memory units to make better use of this parallel capability.

In preferred embodiments it is desirable that the cache victim select circuit should be responsive to a dirty flag (a flag indicating that a line contains one or more data words that have been changed since they were transferred to the cache memory from the main memory) associated with the cache storage lines so as to select in preference those cache storage lines that are marked as non-dirty. Non-dirty cache storage lines will not require writing back to the main memory and so the delay associated with refilling that cache storage line will be reduced.

In modem high performance data processing systems it is advantageously efficient to provide more than one data word requesting unit that may each request exchange of one or more data words with the cache memory. Sharing the memory structures between data word requesting units in this way provides an advantageous compromise between making the most efficient use of the circuit resources provided balanced against the requirements for maximum performance.

Typical examples of data word requesting units are a central processing unit and a video display driving circuit.

In a system having multiple data word requesting units as discussed above, it is desirable that one or more cache storage lines may be locked for preferential use by one of the data word requesting units. In this way it is possible to reduce the likelihood of the activity of one of the data word requesting units having an undue detrimental impact upon the performance of another of the data word requesting units.

A further way in which the cache memory resources may be made better use of is to arrange the cache victim select circuit to be responsive to an indication of which cache storage lines were least recently used when selecting the victim cache storage line.

An overall scheme that has been found particularly advantageous is one in which said cache victim select circuit selects as said victim cache storage line that cache storage line having properties placing it highest in a list of N properties, where 1≦N≦6, said list of N properties being formed of the N highest properties in the list:

(i) least recently used line that is not locked and is not dirty;

(ii) least recently used line that is not locked, is dirty and can be written back to a main memory unit that is not busy;

(iii) least recently used line that is not locked, is dirty and has to be written back to a main memory unit that is busy;

(iv) least recently used line that is locked and is not dirty;

(v) least recently used line that is locked, is dirty and can be written back to a main memory unit that is not busy;

(vi) least recently used line that is locked, is dirty and has to be written back to a main memory unit that is busy.

In some circumstances a partially random cache victim selection scheme may be preferred as a starting point and in such embodiments said cache victim select circuit selects as said victim cache storage line that cache storage line having properties placing it highest in a list of N properties, where 1≦N≦6, said list of N properties being formed of the N highest properties in the list:

(i) randomly selected from those cache storage lines that are not locked and are not dirty;

(ii) randomly selected from those cache storage lines that are not locked, are dirty and can be written back to a main memory unit that is not busy;

(iii) randomly selected from those cache storage lines that are not locked, are dirty and have to be written back to a main memory unit that is busy;

(iv) randomly selected from those cache storage lines that are locked and are not dirty;

(v) randomly selected from those cache storage lines that are dirty and can be written back to a main memory unit that is not busy;

(vi) randomly selected from those cache storage lines that are locked, are dirty and have to be written back to a main memory unit that is busy.

In other circumstances a partially round robin cache victim selection scheme may be preferred as a starting point and in such embodiments said cache victim select circuit selects as said victim cache storage line that cache storage line having properties placing it highest in a list of N properties, where 1≦N≦6, said list of N properties being formed of the N highest properties in the list:

(i) selected in sequence from those cache storage lines that are not locked and are not dirty;

(ii) selected in sequence from those cache storage lines that are not locked, are dirty and can be written back to a main memory unit that is not busy;

(iii) selected in sequence from those cache storage lines that are not locked, are dirty and have to be written back to a main memory unit that is busy;

(iv) selected in sequence from those cache storage lines that are locked and are not dirty;

(v) selected in sequence from those cache storage lines that are locked, are dirty and can be written back to a main memory unit that is not busy;

(vi) selected in sequence from those cache storage lines that are dirty and have to be written back to a main memory unit that is busy.

The system may be configured to operate with only some of the properties (e.g. be responsive to properties (i), (ii) and (iii) or (i) and (ii)) and then, if a matching cache storage line if not found, at least part of the system is placed into a wait state until a suitable victim becomes available.

The plurality of main memory units may be main memory units at the same level within the memory hierarchy. In this context banks of dynamic random access memory that may be concurrently and independently accessed are particularly well suited for use with the invention and are increasingly desirable for other reasons, such as reduced cost single-chip designs.

Viewed from another aspect the present invention provides a data processing method comprising the steps of:

(i) storing data words within a plurality of cache storage lines of a cache memory;

(ii) storing in a plurality of main memory units said data words to be cached within said cache memory; and (iii) selecting a victim cache storage line into which one or more data words are to be transferred from one of said main memory units following a cache miss; wherein (iv) said selection is responsive to an operational state of at least one of said main memory units when selecting said victim cache storage line.

Viewed from a further aspect the present invention provides a data processing apparatus comprising:

(i) a write back cache memory having a plurality of cache storage lines;

(ii) at least one main memory unit operable to store data words to be cached within said cache memory, a cache storage line being dirty if it contains any data words that have been changed since they were transferred from said at least one main memory unit to said cache storage line; and (iii) a background operation control circuit for triggering writing back of data words from dirty cache storage lines to said at least one main memory unit as a background process, cache storage lines written back using said background process becoming not dirty and continuing to store said data words that were written back.

Write back caches have the advantage that data transfers between the cache and the main memory are reduced in number. More particularly, a data transfer to the main memory only occur when the data words are loaded into the cache and then when the data words are flushed from the cache. Changes that occur to the data words whilst they are stored within the cache are not passed to the main memory but are left until the cache data is flushed from the main memory when the final state of the data words is written into the main memory. If data words that are cached have not been changed whilst they were stored in the cache then there is no need for them to be written back to the main memory. Accordingly, in order to differentiate between cache data words requiring writing back and those not requiring writing back a dirty flag may be provided.

The invention recognizes that cache refills to dirty cache lines are slower than to non-dirty cache lines and so measures that can reduce the number of cache refills needed to dirty cache lines are advantageous. The invention further recognizes that there are periods of time in which the bandwidth between the main memory and the cache memory is not being fully utilized or may in fact be standing completely idle if all of the data requirements of the system can be met from cached data. The invention exploits this otherwise unused capacity to reduce the number of dirty cache lines within the cache memory as a background process. This in turn reduces the number of write backs of dirty cache data that have to be performed during the foreground processing operations which are accordingly speeded up.

In a normal system dirty data is written back to the main memory as it is flushed (i.e. removed) from the cache memory. In contrast, in the present invention the dirty data is written back to the main memory but is also retained within the cache memory but now being marked as non-dirty.

The present invention is particularly useful in systems having a plurality of main memory units that are able to operate independently and concurrently to transfer data words to the cache memory as such systems will often have unused bandwidth between the cache memory and the main memory that can be exploited by the background process of the present invention.

In preferred embodiments the background process is also responsive to how recently a cache data word has been used when determining whether or not it should be written back if dirty. If a cached data word is being used very frequently and so likely to change very frequently, then it is advantageous that it should not be written back as part of the background process since this would consume a disadvantageous amount of electrical power and may also utilize some of the spare bandwidth to the main memory system that could be more effectively used by writing back cached data words that infrequently changed and so would be likely to remain non-dirty once they had been written back.

A further refinement in the background process is that write backs should not be attempted to main memory units that are already busy servicing another memory access request.

The invention is particularly well suited to embodiments in which the main memory unit comprises a plurality of banks of dynamic random access memory of flash memory and that is fabricated as a single-chip device, although commodity DRAM or flash memory could be used.

Viewed from a further aspect the present invention provides a data processing method comprising the steps of:
 (i) storing data words within a plurality of cache storage lines of a write back cache memory;
 (ii) storing in at least one main memory unit said data words to be cached within said cache memory, a cache storage line being dirty if it contains any data words that have been changed since they were transferred from said at least one main memory unit to said cache storage line; and
 (iii) writing back data words from dirty cache storage lines to said at least one main memory unit as a background process, cache storage lines written back using said background process becoming not dirty and continuing to store said data words that were written back.

Viewed from a further aspect the present invention provides data processing apparatus comprising:
 (i) a memory circuit;
 (ii) a data bus coupled to said memory circuit;
 (iii) a plurality of bus master circuits coupled to said data bus for issuing memory access requests to said memory circuit via said data bus;
 (iv) a bus arbitration circuit for controlling in accordance with a hierarchy of bus master priorities which bus master is granted priority in gaining use of said data bus when more two or more bus masters issue temporally overlapping memory access requests; wherein (v) said bus arbitration circuit is responsive to a determination of latency of pending memory access requests to re-arbitrate priority in gaining use of said data bus between bus masters such that a first bus master circuit having a first pending memory access request and a lower position in said hierarchy than a second bus master circuit having a second pending memory access request may gain use of said data bus ahead of said second bus master circuit if said first memory access request has a lower latency than said second memory access request.

Bus arbitration between different bus masters normally is performed based upon a fixed hierarchy of priorities. However, the present invention recognizes that more efficient use of the bus band width can be made when the bus arbitration circuit is responsive to a determination of the latency of different memory access requests and is able to re-arbitrate the priorities in dependence upon the determined latencies.

In particularly preferred embodiments it may be possible for a second memory access request to be started and completed entirely within the latency period of a first memory access request before that first memory access request in fact needs to use the data bus to complete.

A common situation in which the invention may be advantageously used is one in which the memory system comprises a cache memory and a main memory. In such systems if a high priority first memory access request results in a cache miss whereas a lower priority second memory access request results in a cache hit, then it is advantageous to re-arbitrate the priorities such that the second memory access request is serviced from the cache memory whilst the first memory access request continues to progress to perform the data fetch from main memory and cache line refill.

In an analogous manner in a system including a plurality of main memory units that can independently and concurrently operate, the invention may advantageously operate to re-arbitrate between memory access requests such that a request to a non-busy main memory unit may be moved ahead of an otherwise higher priority request to a busy main memory unit.

The invention is particularly useful in embodiments in which the main memory comprises one or more banks of dynamic random access and the system is provided as a single-chip.

Viewed from a further aspect the present invention provides a data processing method comprising the steps of:
 (i) issuing memory access requests from a plurality of bus master circuits to a memory circuit via a data bus;
 (ii) controlling, in accordance with a hierarchy of bus master priorities, which bus master is granted priority in gaining use of said data bus when more two or more bus masters issue temporally overlapping memory access requests; wherein
 (iii) in response to a determination of latency of pending memory access requests, priority in gaining use of said data bus between bus masters is re-arbitrated such that a first bus master circuit having a first pending memory access request and a lower position in said hierarchy than a second bus master circuit having a second pending memory access request may gain use of said data bus ahead of said second bus master circuit if said first memory access request has a lower latency than said second memory access request.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 illustrates a bus re-arbitration operation within a bus arbiter.

DESCRIPTION OF THE PREFERRED EMBODIMENTS

Figure 1:
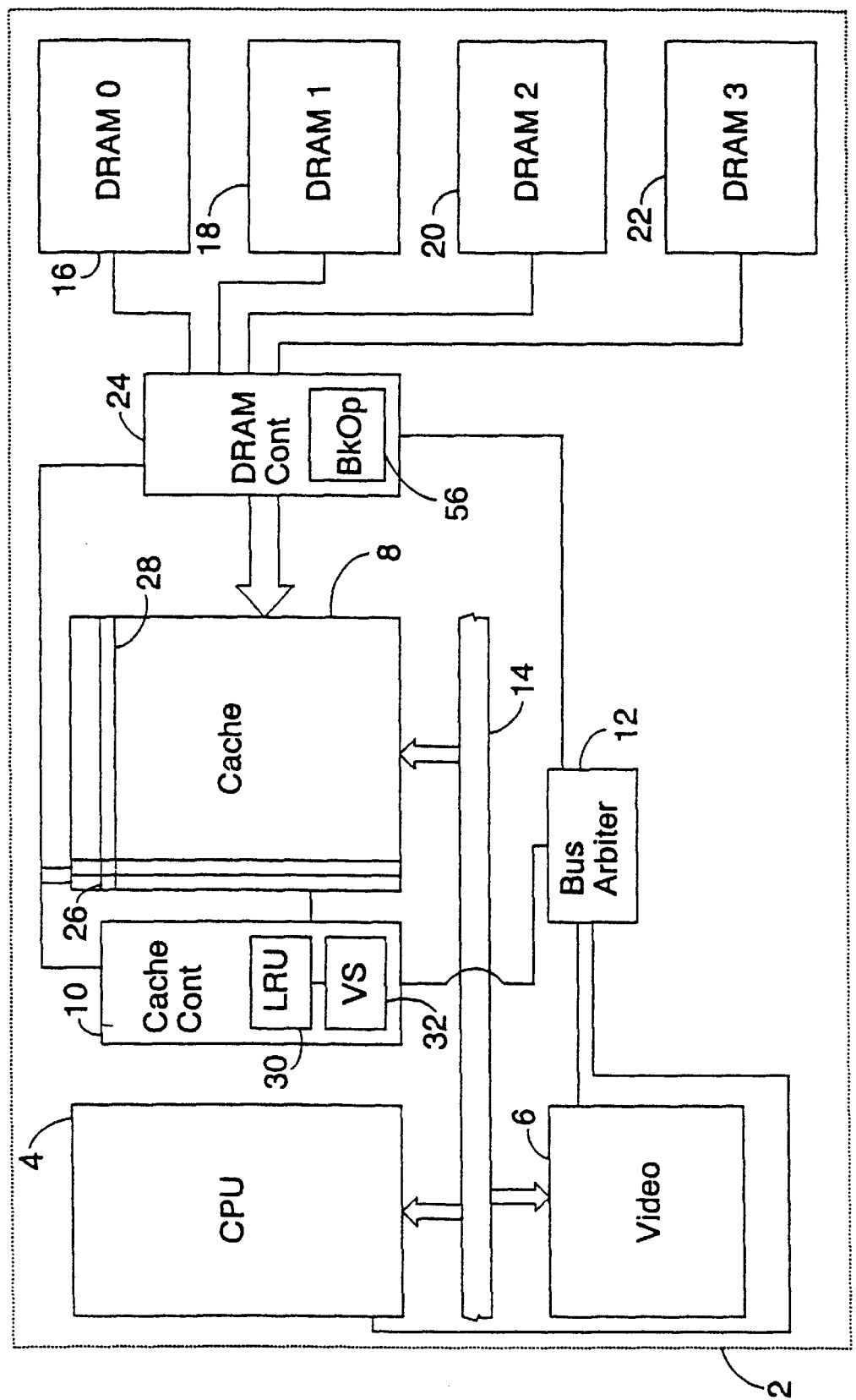
FIG. 1 illustrates a data processing system.

FIG. 1 shows a single-chip data processing system 2 that includes a central processing unit 4, a video display control circuit 6 and a cache memory 8. A cache controller 10 is provided for controlling the operation of the cache memory 8. A bus arbitration circuit 12 controls which of the central processing unit 4 and the video display controller 6 gains access to a data bus 14 in making memory access requests (MARs).

Four banks of on-chip dynamic random access memory 16, 18, 20 and 22 are provided together with a DRAM controller 24.

In operation either of the central processing unit 4 or video display control circuit 6 may issue a memory access request upon the data bus 14. This memory access request passes to the cache memory 8 as the first level within the memory hierarchy. If a cache hit occurs, then the data requested is accessed from within the cache memory 8. If the memory access request makes a change to the data within the cache memory 8, then a dirty-bit 26 is set for the corresponding cache storage line 28. Within the cache controller 10 a least recently used (LRU) circuit 30 stores data indicating how recently each of the cache storage lines 28 within the cache memory 8 has been accessed. It will be appreciated that control circuits performing partially random or partially round robin replacement schemes could be provided instead. Such partially random or partially round robin schemes are modified in dependence upon the detected state of the memory system in a manner analogous to that described below in relation to LRU replacement.

If a cache miss occurs in response to a memory access request, then the target data words must be fetched from a respective one of the DRAM banks 16, 18, 20, 22 and written within one of the cache storage lines 28. Which cache storage line 28 is selected as a victim cache storage line into which this fetched data is to be written is controlled by a victim select circuit 32 within the cache controller 10. If the victim cache storage line is dirty, then it will require writing back to one of the DRAM banks 16, 18, 20, 22 before the fetched data words can be written into the cache storage line 28. Accordingly, the victim select circuit 32 will attempt to select non-dirty victims rather than dirty victims. The cache memory 8 is also provided with lock down regions that may be dedicated to particular ones of the memory access requesting units, such as the central processing unit 4 and the video display control circuit 6. As an example, fast interrupt code required by the central processing unit 4 may be locked down within a region of the cache memory 8 so that it is guaranteed to be available for rapid access when needed. The victim select circuit 32 will select non-locked regions in preference to locked regions.

The DRAM controller 24 operates to pass data between the cache memory 8 and the DRAM banks 16, 18, 20, 22. The DRAM controller 24 is configured such that independent and concurrent data transfers between respective DRAM banks 16, 18, 20, 22 and the cache memory 8 may be accommodated. Signals indicating which of the DRAM banks 16, 18, 20, 22 are currently busy are passed from the DRAM controller 24 to the cache controller 10 where they may be used by the victim select circuit 32. The victim select circuit 32 will select a victim cache storage line 28 that requires writing back to a non-busy DRAM bank 16, 18, 20, 22 in preference to one that needs writing back to a busy DRAM bank 16, 18, 20, 22.

In overall operation the victim select circuit 32 selects its victim cache storage line such that it has properties placing it highest in a list of N properties, where $1 \leq N \leq 6$, said list of N properties being formed of the N highest properties in the list:

(i) least recently used line that is not locked and is not dirty;

(ii) least recently used line that is not locked, is dirty and can be written back to a main memory unit that is not busy;

(iii) least recently used line that is not locked, is dirty and has to be written back to a main memory unit that is busy;

(iv) least recently used line that is locked and is not dirty;

(v) least recently used line that is locked, is dirty and can be written back to a main memory unit that is not busy;

(vi) least recently used line that is locked, is dirty and has to be written back to a main memory unit that is busy.

In a partially random replacement scheme the victim select circuit 32 selects its victim cache storage line such that it has properties placing it highest in a list of N properties, where $1 \leq N \leq 6$, said list of N properties being formed of the N highest properties in the list:

(i) randomly selected from those cache storage lines that are not locked and are not dirty;

(ii) randomly selected from those cache storage lines that are not locked, are dirty and can be written back to a main memory unit that is not busy;

(iii) randomly selected from those cache storage lines that are not locked, are dirty and have to be written back to a main memory unit that is busy;

(iv) randomly selected from those cache storage lines that are locked and are not dirty;

(v) randomly selected from those cache storage lines that are dirty and can be written back to a main memory unit that is not busy;

(vi) randomly selected from those cache storage lines that are locked, are dirty and have to be written back to a main memory unit that is busy.

In a partially round robin replacement scheme the victim select circuit 32 selects its victim cache storage line such that it has properties placing it highest in a list of N properties, where $1 \leq N \leq 6$, said list of N properties being formed of the N highest properties in the list:

(i) selected in sequence from those cache storage lines that are not locked and are not dirty;

(ii) selected in sequence from those cache storage lines that are not locked, are dirty and can be written back to a main memory unit that is not busy;

(iii) selected in sequence from those cache storage lines that are not locked, are dirty and have to be written back to a main memory unit that is busy;

(iv) selected in sequence from those cache storage lines that are locked and are not dirty;

(v) selected in sequence from those cache storage lines that are locked, are dirty and can be written back to a main memory unit that is not busy;

(vi) selected in sequence from those cache storage lines that are dirty and have to be written back to a main memory unit that is busy.

It may be that the system only uses some of the properties from these lists since the lower properties are sufficiently disadvantageous that it is better for at least part of the system to enter a wait state until a cache victim matching the more desirable properties becomes available (e.g. it may be that the cache victim selection will respect locked cache storage lines and so properties (i), (ii) and (iii) would be used with properties (iv), (v) and (vi) not being used).

Figure 2:
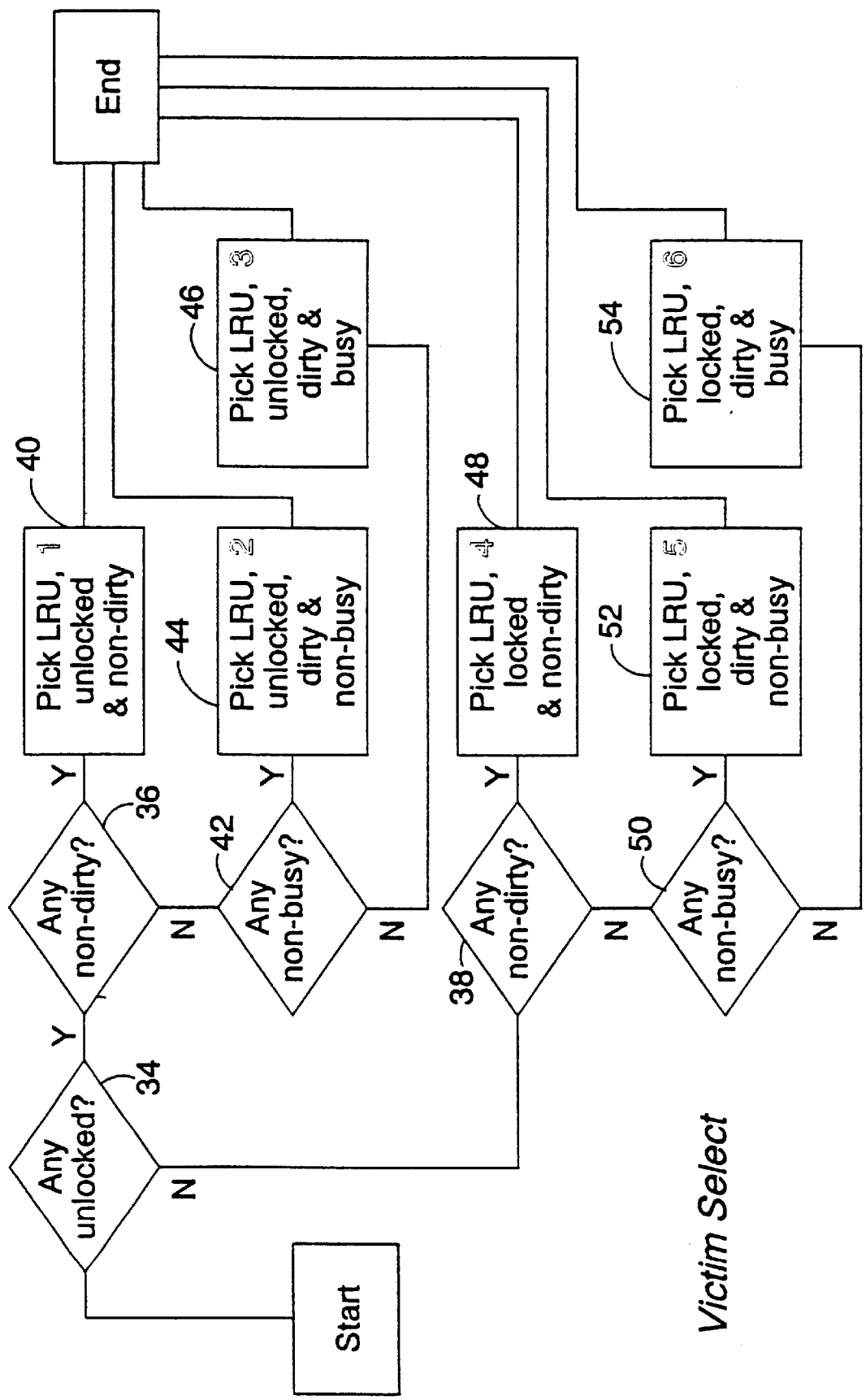
FIG. 2 illustrates the operation of a victim select circuit within a cache controller.

This operation of the victim select circuit 32 is also illustrated in FIG. 2. When a cache miss occurs, then the process illustrated in FIG. 2 starts and the first step 34 is to determine whether there are any unlocked cache storage lines. If there are unlocked cache storage lines, then processing proceeds to step 36. If there are no unlocked cache storage lines, then processing proceeds to step 38.

At step 36 a test is made as to whether there are any non-dirty cache storage lines within the unlocked storage lines. If there are non-dirty unlocked storage lines then the least recently used of these is picked as the victim at step 40. If there are no non-dirty cache storage lines within the unlocked storage lines, then step 42 determines whether any of the unlocked, dirty cache storage lines required writing back to non-busy DRAM banks. If there are such unlocked, dirty and non-busy cache storage lines then the least recently used of these is selected at step 44. If there are no unlocked, dirty and non-busy cache storage lines, then step 46 selects the least recently used of the unlocked, dirty and busy cache storage lines for use as the victim cache storage line.

If step 34 revealed that there were no unlocked cache storage lines, then processing proceeds to step 38 at which a test is made as to whether any of the locked cache storage lines are non-dirty. If there are locked, non-dirty cache storage lines, then the least recently used of these is selected as the victim cache storage line at step 48. If there are no locked, non-dirty locked cache storage lines detected at step 38, then step 50 is used to determine whether there are any locked, dirty and non-busy cache storage lines. If there are such locked, dirty and non-busy cache storage lines, then the least recently used of these is selected at step 52 for the victim cache storage line. If there are no locked, dirty and non-busy cache storage lines, then step 54 selects the least recently used, locked, dirty and busy cache storage line as the victim cache storage line. The order of preference of the selections made by the victim select circuit 32 in accordance with the is scheme is illustrated by the outlined number in the upper right hand corner of the steps 40, 44, 46, 48, 52 and 54 in FIG. 2.

Returning to FIG. 1, the DRAM controller 24 also includes a background operation control circuit 56. This background operation control circuit 56 continuously executes a background process that attempts to write back dirty cache storage lines from within the cache memory 8 to the DRAM banks 16, 18, 20, 22 subject to certain conditions being met. The background process performed by the background operation control circuit 56 is responsive to the least recently used status (or other memory system state information) of the cache lines 28 as supplied by the least recently used circuit 30 within the cache controller 10 as well as the busy-status of the DRAM bank 16, 18, 20, 22 associated with the cache lines concerned.

Figure 3:
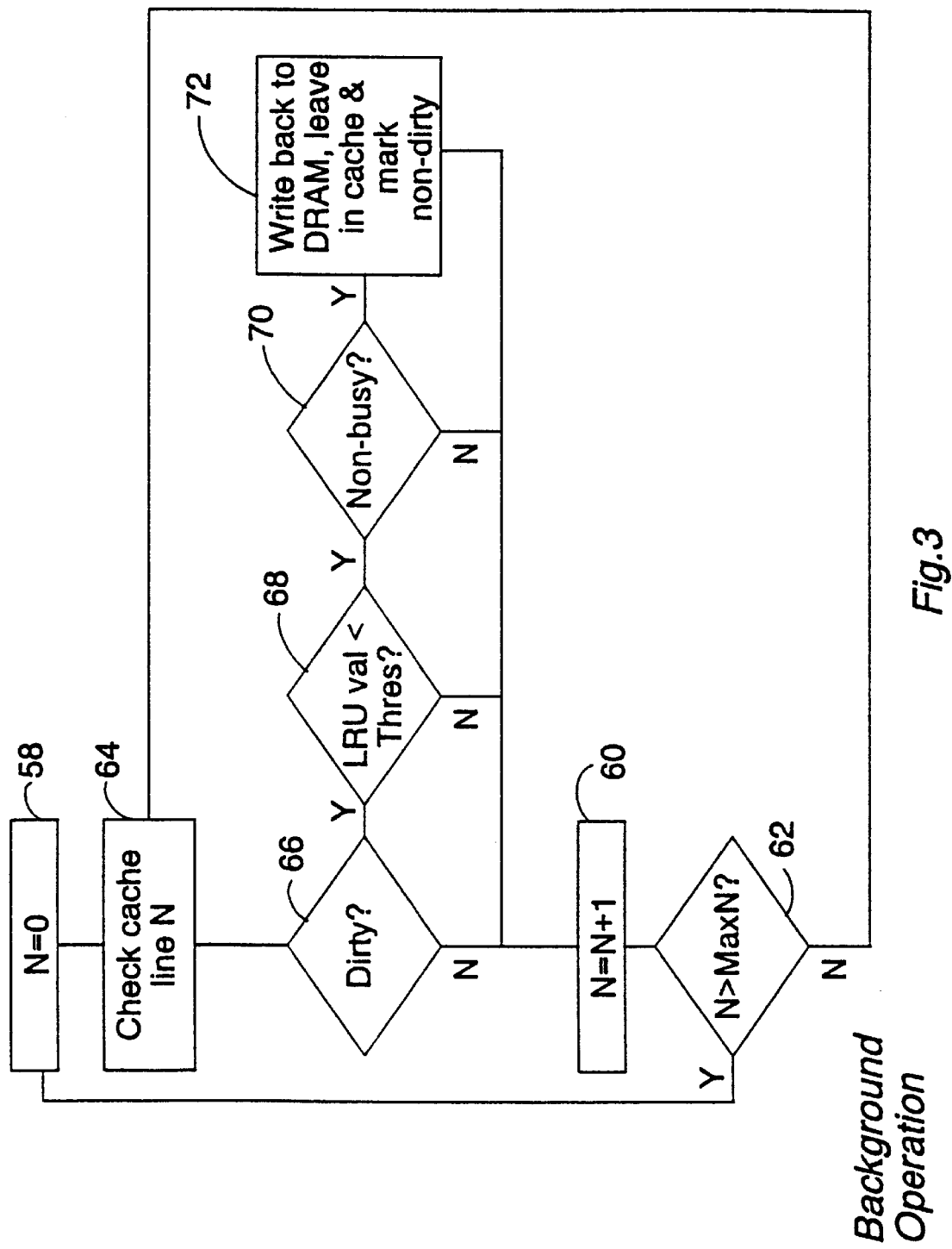
FIG. 3 illustrates operation of a background processing function for writing back dirty cache lines.

FIG. 3 illustrates the process continuously operated by the background operation control circuit 56. Steps 58, 60 and 62 effectively form a loop whereby the cache line check 64 may be repeatedly performed upon each of the cache lines within the cache memory 8. For each cache line in turn a check is made as to whether it is dirty at step 66, whether its least recently used value is less than a certain threshold value at step 68 (indicating that it has not been accessed more recently than a certain threshold), and its non-busy status is checked at step 70. If each of the determinations at steps 66, 68 and 70 results in a Yes, then step 72 serves to write back that cache line to what will be a non-busy DRAM bank 16, 18, 20, 22 and change the dirty bit 26 for that cache line from dirty to non-dirty whilst leaving the data in the cache line 28. If any of the steps 66, 68 and 70 return a No, then this indicates that the cache line being tested is not suitable for writing back as part of the background process and accordingly step 72 is bypassed and the next cache line in turn is subject to the tests.

The scheme described in relation to FIG. 3 tests each cache line in turn to check if it meets the criteria for a background write back operation. Alternative embodiments could have circuits associated with each cache line for continuously monitoring whether or not that cache line met the criteria. When a cache line that met the criteria was identified, a write back operation could be triggered. These monitoring circuits would act in parallel and so an arbitrator circuit would be need to deal with this situation where two or more cache lines simultaneously met the criteria.

Returning to FIG. 1, this shows a bus arbitration circuit 12 that serves to determine which one of the central processing unit 4 and the video display control circuit 6 will be given use of the data bus 14 for its memory access requests if these should temporally overlap. In general, the first level f control used by the bus arbiter 12 is to apply a predetermined hierarchy of priorities in which the video display controlling circuit 6 has a higher priority than the central processing unit 4 and accordingly has its memory access requests serviced in preference over those for the central processing unit 4. The bus arbitration circuit 12 is also coupled to the cache controller 10 and the DRAM controller 24. These links allow signals to be passed to the bus arbitration circuit 12 indicating whether a particular memory access request being serviced has resulted in a cache miss and furthermore whether that cache miss has resulted in a memory access being required to a DRAM bank 16, 18, 20, 22 that is busy. The bus arbitration circuit may utilize this additional information to re-arbitrate the normal hierarchy of priorities between memory access requests.

FIG. 4 illustrates bus re-arbitration processing that may be performed by the bus arbitration circuit 12. The process is started when at least one memory access request MAR is received. At step 74 a check is made to determine whether more than one MAR has been received in that cycle. If only a single MAR has been received, then this is started and completed at steps 76 and 78 as illustrated.

If more than one MAR has been received, then step 80 starts the higher priority MAR as the first memory access request MAR1 and puts the lower priority MAR on hold as the second memory access request MAR2.

At step 82 a test is made as to whether or not the first memory access request MAR1 has resulted in a cache miss using information provided by the cache controller 10. If a cache miss has not occurred, then the first memory access request MAR1 is completed at step 84 with the second memory access request MAR2 being started and completed and steps 86 and 88.

If the first memory access request MAR1 did result in a cache miss, then step 90 determines whether or not the second memory access request is to cached data. If the second memory access request is not to cached data (i.e will itself result in a cache miss), then processing proceeds via steps 84, 86 and 88 as above. However, if the second memory access request MAR2 is cached, then the bus arbitration circuit 12 operates at step 92 to re-arbitrate between the first memory access request MAR1 and the second memory access request MAR2. This re-arbitration starts the second memory access request MAR2 operating whilst leaving the first memory access request MAR1 operating performing its cache line fill since the system design is such that the latency determination performed by the bus arbiter in sensing that the first memory access request MAR1 is a cache miss ensures that the data from that cache miss will not be returned to the data bus 14 until the second memory access request to the cached data has in finished. Accordingly, step 94 completes the second memory access request MAR2 prior to step 96 completing the first memory access request MAR1.

In the example illustrated in FIG. 4 the determination of the latency by the bus arbitration circuit 12 is via a determination as to whether or not a cache miss occurred. The bus arbitration circuit 12 may also be responsive to whether or not a memory access request is to a busy DRAM bank 16, 18, 20, 22 and so will have a particularly high latency allowing an opportunity for re-arbitration to make better use of the data bus 14. Further latency determinations and control schemes for bus master re-arbitration in accordance with this general principle are possible.

The above embodiments of the invention have been described in the context of a single-chip device in which the DRAM banks 16, 18, 20, 22, the cache memory 8, the cache controller 10 and all of the other circuits are provided as a single integrated circuit. The above described techniques may also be advantageously applied to what is known as "virtual channel memory". Virtual channel memory is provided in the form of integrated circuits having a plurality of DRAM banks together with an on-chip buffer/cache. Circuits making use of such virtual channel memory chips include a memory controller that may keep track of what is stored within the on-chip buffer/cache of the virtual channel memory. In the context of FIG. 1, the cache memory 8 and the DRAM bank 16, 18, 20 and 22 can be considered to be provided upon the virtual channel memory chip with the other elements all being provided upon a separate chip. The techniques described above are highly beneficial in making the most efficient use of such virtual channel memory systems.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Data processing apparatus comprising:
   (i) a memory circuit;
   (ii) a data bus coupled to said memory circuit;
   (iii) a plurality of bus master circuits coupled to said data bus for issuing memory access requests to said memory circuit via said data bus;
   (iv) a bus arbitration circuit for controlling in accordance with a hierarchy of bus master priorities which bus master is granted priority in gaining use of said data bus when more two or more bus masters issue temporally overlapping memory access requests; wherein
   (v) said bus arbitration circuit is responsive to a determination of latency of pending memory access requests calculated in dependence upon a current state of said memory circuit to re-arbitrate priority in gaining use of said data bus between bus masters such that a first bus master circuit having a first pending memory access request and a lower position in said hierarchy than a second bus master circuit having a second pending memory access request may gain use of said data bus ahead of said second bus master circuit if said first memory access request has a lower latency than said second memory access request.

2. Data processing apparatus as claimed in claim 1, wherein said first bus master circuit is given use of said data bus ahead of said second bus master circuit when said first memory access request has a latency such that it may be completed before said second memory access request is ready to transfer data words via said data bus.

3. Data processing apparatus as claimed in claim 1, wherein said memory circuit comprises a cache memory and a main memory.

4. Data processing apparatus as claimed in claim 3, wherein when said second memory access request results in a cache miss so that a main memory access is required, said bus arbitration circuit re-arbitrates priority such that if said second memory access request results in a cache miss, then said first bus master circuit will gain use of said data bus ahead of said first bus master circuit.

5. Data processing apparatus as claimed in claim 1, wherein said memory circuit comprises a plurality of main memory units, said plurality of main memory units being operable to independently and concurrently service respective memory access requests.

6. Data processing apparatus as claimed in claim 5, wherein, if said second memory access request is to a main memory unit that is already busy servicing another memory access request and said second memory access request is to a main memory unit that is not already busy servicing a memory access request such that said second memory access request has a lower latency than said first memory access request, then said bus arbitration circuit re-arbitrates between said plurality of bus master circuits such that said second bus master circuit gains use of said data bus ahead of said first bus master circuit.

7. Data processing apparatus as claimed in claim 5, wherein said plurality of main memory units are a plurality of banks of dynamic random access memory.

8. Data processing apparatus as claimed in claim 1, wherein said memory circuit, said data bus, said plurality of bus master circuits and said bus arbitration circuit are provided together on an integrated circuit.

9. Data processing apparatus as claimed in claim 1, wherein said plurality of bus master circuits include a central processing unit.

10. Data processing apparatus as claimed in claim 1, wherein said plurality of bus master circuits include a video display driving circuit.

11. A data processing method comprising the steps of:
   (i) issuing memory access requests from a plurality of bus master circuits to a memory circuit via a data bus;
   (ii) controlling, in accordance with a hierarchy of bus master priorities, which bus master is granted priority in gaining use of said data bus when more two or more bus masters issue temporally overlapping memory access requests; wherein (iii) in response to a determination of latency of pending memory access requests calculated in dependence upon a current state of said memory circuit, priority in gaining use of said data bus between bus masters is re-arbitrated such that a first bus master circuit having a first pending memory access request and a lower position in said hierarchy than a second bus master circuit having a second pending memory access request may gain use of said data bus ahead of said second bus master circuit if said first memory access request has a lower latency than said second memory access request.

12. Data processing apparatus comprising:

(i) a memory circuit;

(ii) a data bus coupled to said memory circuit;

(iii) a plurality of bus master circuits coupled to said data bus for issuing memory access requests to said memory circuit via said data bus;

(iv) a bus arbitration circuit for controlling in accordance with a hierarchy of bus master priorities which bus master is granted priority in gaining use of said data bus when two or more bus masters issue temporally overlapping memory access requests; wherein (v) said bus arbitration circuit is responsive to a determination of latency of pending memory access requests calculated in dependence upon a current state of said memory circuit to re-arbitrate priority in gaining use of said data bus between bus masters such that a first bus master circuit having a first pending memory access request and a lower position in said hierarchy than a second bus master circuit having a second pending memory access request may gain use of said data bus ahead of said second bus master circuit if said first memory access request has a lower latency than said second memory access request;

wherein said first bus master circuit is given use of said data bus ahead of said second bus master circuit when said first memory access request has a latency such that it may be completed before said second memory access request is ready to transfer data words via said data bus.

13. A data processing method comprising the steps of:

(i) issuing memory access requests from a plurality of bus master circuits to a memory circuit via a data bus;

(ii) controlling, in accordance with a hierarchy of bus master priorities, which bus master is granted priority in gaining use of said data bus when two or more bus masters issue temporally overlapping memory access requests; wherein (iii) in response to a determination of latency of pending memory access requests calculated in dependence upon a current state of said memory circuit, priority in gaining use of said data bus between bus masters is re-arbitrated such that a first bus master circuit having a first pending memory access request and a lower position in said hierarchy than a second bus master circuit having a second pending memory access request may gain use of said data bus ahead of said second bus master circuit if said first memory access request has a lower latency than said second memory access request; and (iv) giving said first bus master circuit use of said data bus ahead of said second bus master circuit when said first memory access request has a latency such that it may be completed before said second memory access request is ready to transfer data words via said data bus.

* * * * *

UNITED STATES PATENT AND TRADEMARK OFFICE
CERTIFICATE OF CORRECTION

| | | |
|---|---|---|
| PATENT NO. | : 6,684,302 B2 | Page 1 of 1 |
| APPLICATION NO. | : 10/202030 | |
| DATED | : January 27, 2004 | |
| INVENTOR(S) | : Kershaw | |

It is certified that error appears in the above-identified patent and that said Letters Patent is hereby corrected as shown below:

The following should appear on the title page:

Item (63)

--Related U.S. Application Data

(63) Division of application No. 09/394,424, filed on Sep. 13, 1999, now Pat. No. 6,490,655.--

Signed and Sealed this

Second Day of June, 2009

JOHN DOLL
*Acting Director of the United States Patent and Trademark Office*